UNITED STATES PATENT OFFICE.

GEORGE HENRY HUGHES, OF LONDON, ENGLAND.

CATTLE-FOOD.

SPECIFICATION forming part of Letters Patent No. 707,113, dated August 19, 1902.

Application filed January 31, 1902. Serial No. 92,052. (No specimens.)

*To all whom it may concern:*

Be it known that I, GEORGE HENRY HUGHES, a subject of the King of Great Britain, residing at 155 Fenchurch street, in the city of London, England, have invented a certain new and useful Cattle-Food, of which the following is a specification.

According to my invention I provide an improved cattle-food by combining in the manner hereinafter described the pith of the sugar-cane with molasses.

In carrying out my invention I prefer to proceed as follows: I first obtain the pith of the cane either by disintegrating crushed cane or by straining out from expressed juice the pith, or I may obtain the pith for my process by both methods above described, my object being to separate from the hard outer fiber or cane proper the pith from which the juice has been expressed. The hard outer fiber is usually one-eighth of an inch in thickness. This is the part that is discarded, while the pith from which the juice has been expressed is saved and used by me, being mixed with molasses, which latter is absorbed by the pithy matter, producing a fairly dry mixture, the proportions of the ingredients being preferably about twenty per cent. of dry pith to eighty per cent. of molasses; but the proportions of the material may be varied according to circumstances, especially the density of the molasses. Such a mixture is fairly dry; but it is better to further dry it at a temperature of about 212° Fahrenheit. I preferably make a meal or powder of the mixture, and this may, if preferred, be pressed into cakes. Albuminous and other matters extracted from the juice and known as "filter-press cake" may, if preferred, be added to the mixture.

I claim as my invention—

1. A cattle-food comprising a comparatively dry mixture of the pith of the sugar-cane and molasses.

2. A meal for cattle-food comprising a comparatively dry mixture of the pith of the sugar-cane and molasses which is absorbed by the pith.

GEORGE HENRY HUGHES.

Witnesses:
E. COURTNEY WALKER,
F. DUCK.